June 26, 1956 T. B. D. TERRONI 2,752,571

CARRIER CURRENT TRANSMISSION SYSTEMS

Filed March 14, 1952

INVENTOR
Teseo Bruno Dante Terroni
BY
Lippincott & Smith
ATTORNEYS

United States Patent Office 2,752,571

Patented June 26, 1956

2,752,571

CARRIER CURRENT TRANSMISSION SYSTEMS

Teseo Bruno Dante Terroni, Liverpool, England, assignor to Automatic Telephone & Electric Company Limited, Liverpool, England, a British company Application March 14, 1952, Serial No. 276,641

Claims priority, application Great Britain April 12, 1951

4 Claims. (Cl. 333—16)

The present invention relates to carrier current transmission systems and is mare particularly concerned with automatic gain control arrangements for use on such systems.

In carrier current transmission systems, a pilot signal is often used for automatically controlling the gain of amplifiers in the transmission line, and the pilot signal is generated at great constancy of amplitude and transmitted together with the carrier waves. At points in the line where automatic gain control is required such as repeater stations and the receive terminal station, the pilot signal is tapped off by means of filters and the pilot frequency voltage used to operate a gain-controlling device associated with the line.

As a precaution against failure in the pilot signal generating equipment it is desirable to provide means for maintaining the gain control device at some particular setting if the pilot signal should fail. If this were not provided, the gain of each of the repeater stations in the line would in such a case tend to change to either a maximum or a minimum and in either case an undesirable condition would arise.

One simple and convenient solution of this problem is to employ a relay connected in the anode circuit of a thermionic amplifier which is used to amplify the pilot signal, the relay acting as a detector device for the presence of a pilot signal and also as means for switching into circuit gain-stabilising equipment in the event of pilot failure.

However a disadvantage of operating an alarm relay with the pilot signal is that much of the available power is absorbed by the relay, leaving a diminished amount for operation of the gain-controlling device. It would be possible to use the normal direct current taken by the thermionic tube to operate a relay connected to its anode, but in order that the relay would not be operated when no signal is applied to the grid, the tube would need to be biased to such an extent that a very large input signal would be required. A further disadvantage of such an arrangement is that the pilot signal would be rectified.

It is the object of the present invention to provide automatic gain control equipment of the above type which avoids these disadvantages.

According to the invention, in a carrier current transmission system employing a pilot signal for automatically controlling the gain of amplifiers in the transmission line, the gain-controlling circuits of the amplifiers include a thermionic tube amplifier having one or more stages arranged to amplify the pilot signal input to the gain control device and as regards said one stage or the final stage where more than one stage is employed to operate on the rectified reaction principle, a relay being controlled by the anode current flow in the tube of said one stage or said final stage to actuate gain-stabilising arrangements in the event of failure of the pilot signal.

Figure 1:
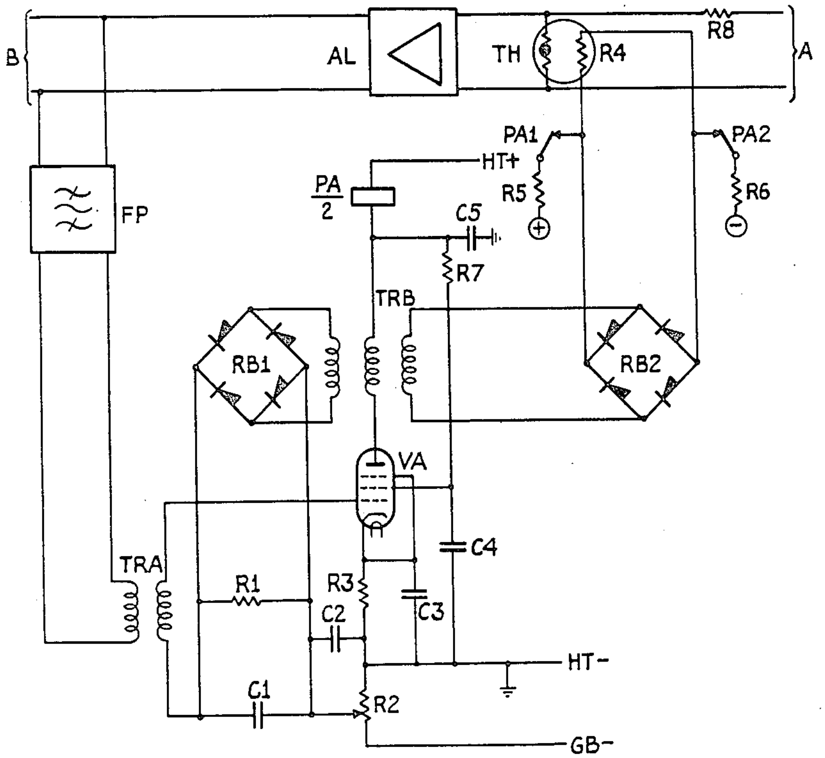
Figure 2:
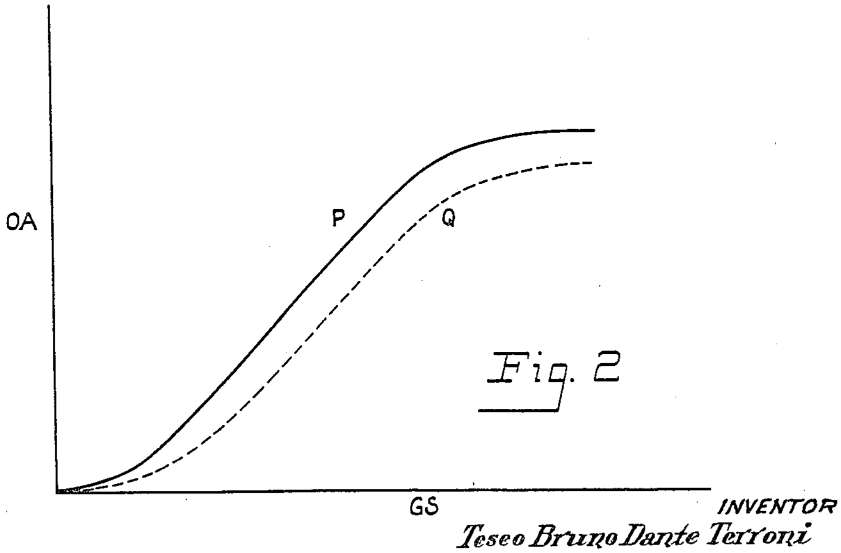

The invention will be more easily understood from the following description of one method of carrying it into effect which should be read in conjunction with the accompanying drawings comprising Figs. 1 and 2.

Of these Fig. 1 is a schematic circuit arrangement of the gain control equipment, and Fig. 2 shows a typical pair of output curves for the pilot signal amplifier.

Referring to Fig. 1 a carrier current transmission line AB has its direction of transmission from A to B. Gain controlling equipment in the signal path is shown as comprising an indirectly-heated thermistor element TH shunting the line and an amplifier AL. At a suitable point following the amplifier, the gain-controlling pilot signal, which is transmitted together with the carrier waves, is tapped off via a band-pass filter FP and fed to the primary winding of transformer TRA which is the input transformer of the thermionic tube VA.

Tube VA is connected so as to operate on the rectified reaction principle. The alternating component of anode current in the centre coil of the three-winding transformer TRB induces an alternating voltage in the left-hand winding and the D. C. output of the bridge rectifier RB1 causes a direct voltage to be set up across resistor R1. Since this resistor forms part of the D. C. path between cathode and grid of the tube VA the voltage across it influences the bias applied to the tube.

When no signal is applied to the grid the voltage across resistor R1 will be zero and the bias will be determined by the position of the tapping point on resistor R2 which is connected across a suitable D. C. source represented by the leads marked HT— and GB—, the former of which is at earth potential. When a signal is present the biasing voltage is the sum of the voltages across the resistors R1 and R3, and the effective portion of R2, resistor R3 being the usual auto-bias resistor shunted by the capacitor C3.

The position of the tapping point on resistor R2 is fixed so that in the absence of a signal the tube takes substantially no current. When a small signal is present a direct voltage will be produced across resistor R1 as previously explained which makes the grid more positive with respect to the cathode, and the tube consequently takes more current. The amplification of the signal is also greater than would be the case if there were no feedback circuit and the tube were similarly biased to cut-off.

The slope and shape of the output curves of the amplifier can be varied by varying the amount of stage gain and the standing bias. A pair of typical output curves is shown in Fig. 2. Curve P represents the alternating voltage developed across the anode-connected winding of transformer TRB plotted on the ordinate OA against signal voltage at transformer TRA plotted on the abscissa GS. For curve Q the ordinate OA represents the anode current corresponding to input signal voltage GS.

The function of relay PA which is connected in the anode circuit of the tube VA is to actuate an alarm if the pilot signal should fail, and also to prevent the gain of the station becoming excessive. The relay is able to remain operated with a small anode current flowing and only releases when there is no signal input to tube VA.

The overall gain at the station is determined by the temperature of the thermistor TH which is shown diagrammatically as being connected in shunt with the transmission line. This thermistor is of the indirectly-heated type, the heating element being shown as resistor R4. The output signal from tube VA is fed to a rectifier bridge RB2, the output of which supplies resistor R4 with heating current.

The output characteristic of tube VA is arranged so that under normal line conditions the input signal corresponds with a point near the centre of the straight portion of curve P in Fig. 2, so that a change in signal strength results in a substantially proportional change of current in resistor R4. A strong signal at A produces a large current in resistor R4 and hence an increase in temperature of the thermistor thus causing its resistance to fall and providing a corresponding increase in attenuation due to the shunting effect of the thermistor.

Normally, with a pilot signal present, relay PA is operated and its contacts PA1 and PA2 are open. Should the pilot signal fail and the relay release, contacts PA1 and PA2 will close and supply heating current to resistor R4 in series with resistors R5 and R6. This arrangement prevents the resistance of the thermistor from increasing, on pilot failure, to a value which would render the station gain undesirably high. If the line included several repeater stations the overall gain of the line would, in such a case, cause instability.

Further contacts would normally be added to the relay to provide audible and other alarms to indicate a failure.

It will, of course, be understood that while the invention has been described in connection with a system employing only a single pilot signal, it could obviously be applied to systems where more than one pilot signal is employed for gain control purposes in which case two circuits similar to that shown in Fig. 1 would be necessary. Again while a single tube amplifier has been illustrated in the gain-controlling circuit, there may be some circumstances where two or more tubes are desirable, in which case the relay would be located in the anode circuit of the final tube which would operate on the rectified reaction principle. Finally the relay in the anode circuit may control the gain stabilising arrangement through a second relay which might be operated or released when the anode circuit relay is operated.

Having now described the invention what is claimed is:

1. In a carrier current transmission system employing a pilot signal for automatically controlling the gain of at least one amplifier in the transmission path, a control path, a control amplifier in said control path and having an input circuit, means in said control path for separating the pilot signal from the transmission path and for applying said pilot signal to said input circuit, a first output circuit for said control amplifier, gain regulating means in said transmission path for controlling the gain of the amplifier in said transmission path, means for applying a control current derived from said first output circuit to said gain regulating means, a second output circuit for said control amplifier, rectifying means in said second output circuit, means for applying a standing cut-off bias to said input circuit, means for applying a voltage derived from said rectifying means to said input circuit in opposition to said standing bias whereby said control amplifier is cut off only in the absence of the pilot signal, a third output circuit for said control amplifier, a switching device controlled by the current flow in said third output circuit and gain stabilizing means for said gain regulating means and controlled by said switching device to apply a constant current to said gain regulating means when said control amplifier is cut off in the absence of said pilot signal.

2. In a carrier current transmission system employing a pilot signal for automatically controlling the gain of at least one amplifier in the transmission path, a control path, a control amplifier in said control path and having an input circuit, means in said control path for separating the pilot signal from the transmission path and for applying said pilot signal to said input circuit, a first output circuit for said control amplifier, gain regulating means in said transmission path, first rectifying means in said first output circuit for supplying a direct current varying in accordance with the amplitude of the amplified pilot signal, circuit means applying said varying direct current to said gain regulating means for controlling the gain of the amplifier in said transmission path, a second output circuit for said control amplifier, second rectifying means in said second output circuit, means for applying a standing cut-off bias to said input circuit, means for applying a voltage derived from said second rectifying means to said input circuit in opposition to said standing bias whereby said control amplifier is cut off only in the absence of the pilot signal, a third output circuit for said control amplifier, a switching device controlled by the current flow in said third output circuit and gain stabilizing means for said gain regulating means and controlled by said switching device to apply a constant current through said circuit means to said gain regulating means when said control amplifier is cut off in the absence of said pilot signal.

3. A carrier current transmission system as claimed in claim 2 wherein said gain regulating means is constituted by an indirectly-heated thermistor and the heater of the thermistor is connected to said circuit means.

4. In a carrier current transmission system employing a pilot signal for automatically controlling the gain of at least one amplifier in the transmission path, a control path, vacuum tube amplifier in said control path and having at least an anode, a cathode and a control grid, a control grid/cathode circuit for said tube, an anode circuit for said tube, filter means in said control path for separating the pilot signal from the transmission path and for applying said pilot signal to said control grid/cathode circuit, a first output circuit coupled to said anode circuit, gain regulating means in said transmission path, first rectifying means in said first output circuit for supplying a direct current varying in accordance with the amplitude of the amplified pilot signal, circuit means applying said varying direct current to said gain regulating means for controlling the gain of the amplifier in said transmission path, a second output circuit coupled to said anode circuit, second rectifying means in said second output circuit, means for applying a standing cut-off bias to said control grid/cathode circuit, means for applying a voltage derived from said second rectifying means to said input circuit in opposition to said standing bias whereby said tube is cut off only in the absence of said pilot signal, a relay connected in said anode circuit a source of steady voltage and contacts on said relay effective when said relay is released in the absence of said pilot signal to connect said source to said circuit means whereby a constant current is applied to said gain regulating means.

References Cited in the file of this patent

UNITED STATES PATENTS

| | | |
|---|---|---|
| 2,269,408 | Kinsburg | Jan. 6, 1942 |
| 2,300,366 | Blair | Oct. 27, 1942 |
| 2,462,452 | Yates | Feb. 22, 1949 |